(12) United States Patent
Sobanski et al.

(10) Patent No.: US 11,359,497 B1
(45) Date of Patent: Jun. 14, 2022

(54) VANE WITH BAFFLE AND RECESSED SPAR

(71) Applicant: RAYTHEON TECHNOLOGIES CORPORATION, Farmington, CT (US)

(72) Inventors: Jon E. Sobanski, Glastonbury, CT (US); Tyler G. Vincent, Portland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/128,355

(22) Filed: Dec. 21, 2020

(51) Int. Cl.
    *F01D 5/18* (2006.01)
    *F01D 9/04* (2006.01)

(52) U.S. Cl.
    CPC ............ *F01D 5/188* (2013.01); *F01D 9/041* (2013.01); *F05D 2220/32* (2013.01); *F05D 2240/12* (2013.01); *F05D 2260/201* (2013.01)

(58) Field of Classification Search
    CPC ..... F01D 5/188; F01D 9/041; F05D 2260/201
    See application file for complete search history.

(56) References Cited

U.S. PATENT DOCUMENTS

| | | | |
|---|---|---|---|
| 5,207,556 A * | 5/1993 | Frederick | F01D 5/189 415/115 |
| 8,500,405 B1 | 8/2013 | Jones et al. | |
| 9,915,151 B2 | 3/2018 | Weaver et al. | |
| 10,107,117 B2 | 10/2018 | Carr et al. | |
| 10,415,428 B2 * | 9/2019 | Spangler | F02C 3/06 |
| 2019/0368360 A1 * | 12/2019 | Freeman | F01D 9/041 |

* cited by examiner

*Primary Examiner* — Michael Lebentritt
*Assistant Examiner* — Brian Christopher Delrue
(74) *Attorney, Agent, or Firm* — Carlson, Gaskey & Olds, P.C.

(57) ABSTRACT

A vane arc segment includes an airfoil section, a spar, and a baffle. The spar supports the airfoil section and has a leg that extends in an internal cavity of the airfoil section. The leg is spaced from the airfoil wall such that there is a gap there between. The baffle divides the gap into a plenum space between the leg and the baffle and an impingement space between the baffle and the airfoil wall. The baffle has impingement holes directed toward the airfoil wall that connect the plenum space and the impingement space. The impingement space is of substantially uniform thickness and the plenum space is of non-uniform thickness along a portion of the span length of the airfoil section.

18 Claims, 3 Drawing Sheets

VANE WITH BAFFLE AND RECESSED SPAR

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A vane arc segment for a gas turbine engine according to an example of the present disclosure includes an airfoil section that has an airfoil wall that defines a leading edge, a trailing edge, a pressure side, a suction side, and first and second ends defining a span length there between. The airfoil section has an internal cavity. A spar supports the airfoil section. The spar has a leg extending in the internal cavity. The leg is spaced from the airfoil wall such that there is a gap there between. The spar has an internal through-passage. A baffle in the internal cavity divides the gap into a plenum space between the leg and the baffle and an impingement space between the baffle and the airfoil wall. The baffle has impingement holes directed toward the airfoil wall that connect the plenum space and the impingement space. The impingement space is of substantially uniform thickness along at least a portion of the span length and the plenum space is of non-uniform thickness along a different portion of the span length.

In a further embodiment of any of the foregoing embodiments, plenum space has a first plenum space segment over which the plenum space is of the non-uniform thickness and a second, adjacent plenum space segment over which the plenum space has substantially uniform thickness.

In a further embodiment of any of the foregoing embodiments, the leg includes a recessed portion along which the plenum space has the non-uniform thickness.

In a further embodiment of any of the foregoing embodiments, the recessed portion extends partially around a perimeter of the leg.

In a further embodiment of any of the foregoing embodiments, the span length is from 0% span at the first end to 100% span at the second end, and the recessed portion is in the span length of 50% to 100%.

In a further embodiment of any of the foregoing embodiments, the recessed portion begins at the span length of greater than 50% and extends to the span length of 100%.

In a further embodiment of any of the foregoing embodiments, recessed portion is U-shaped.

In a further embodiment of any of the foregoing embodiments, the recessed portion projects into the through-passage.

In a further embodiment of any of the foregoing embodiments, the airfoil section is ceramic.

A vane arc segment for a gas turbine engine according to an example of the present disclosure includes a ceramic airfoil section having an airfoil wall that defines a leading edge, a trailing edge, a pressure side, a suction side, and first and second ends defining a span length there between. The ceramic airfoil section has an internal cavity. A spar supports the ceramic airfoil section. The spar has a leg extending in the internal cavity. The leg is spaced from the airfoil wall such that there is a gap there between. The spar has an internal through-passage. The internal through-passage conveys first pressurized air. A baffle in the internal cavity divides the gap into a plenum space between the leg and the baffle and an impingement space between the baffle and the airfoil wall. The baffle has impingement holes directed toward the airfoil wall that connect the plenum space and the impingement space. The plenum space conveys second pressurized air that discharges through the impingement holes onto the leading edge of the airfoil wall. The impingement space is of substantially uniform thickness along at least a portion of the span length and the plenum space is of non-uniform thickness along a different portion of the span length. The non-uniform thickness diffuses the second pressurized air.

In a further embodiment of any of the foregoing embodiments, plenum space has a first plenum space segment over which the plenum space is of the non-uniform thickness and a second, adjacent plenum space segment over which the plenum space has substantially uniform thickness.

In a further embodiment of any of the foregoing embodiments, the leg includes a recessed portion along which the plenum space has the non-uniform thickness.

In a further embodiment of any of the foregoing embodiments, the recessed portion extends partially around a perimeter of the leg.

In a further embodiment of any of the foregoing embodiments, the span length is from 0% span at the first end to 100% span at the second end, and the recessed portion is in the span length of 50% to 100%.

In a further embodiment of any of the foregoing embodiments, recessed portion projects into the through-passage and is U-shaped.

In a further embodiment of any of the foregoing embodiments, the airfoil section is ceramic.

A gas turbine engine according to an example of the present disclosure includes a compressor section, a combustor in fluid communication with the compressor section, and a turbine section in fluid communication with the combustor. The turbine section has a vane arc segment according to any of the foregoing embodiments.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
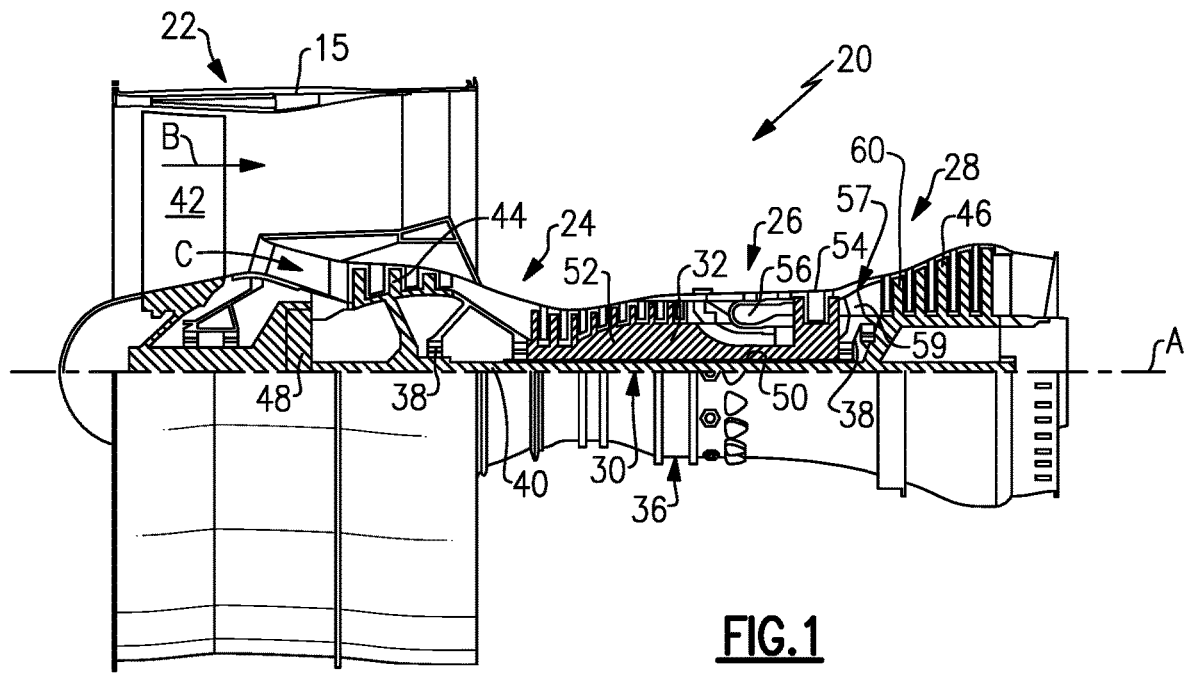
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC)"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/ second).

Figure 2:
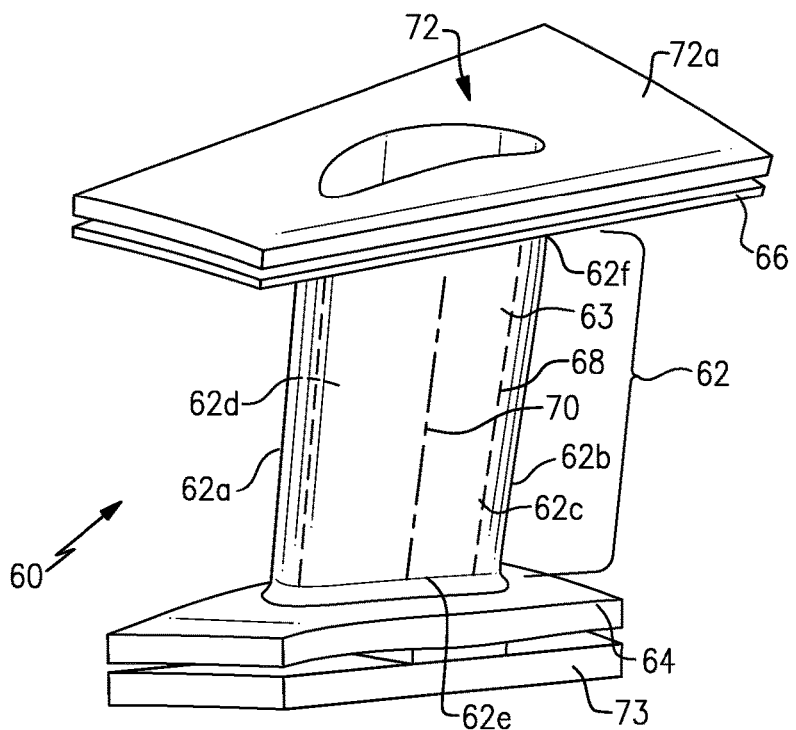
FIG. 2 illustrates a vane arc segment from the engine.

FIG. 2 illustrates a representative example of select portions of a vane arc segment 60 from the turbine section 28 of the engine 20 (see also FIG. 1). It is to be understood that although the examples herein are discussed in context of a vane from the turbine section, the examples can be applied to other cooled vanes that have support spars.

The vane arc segment 60 includes an airfoil section 62 that is formed by an airfoil wall 63. The airfoil section 62 defines a leading edge 62a, a trailing edge 62b, and first and second sides 62c/62d that join the leading edge 62a and the trailing edge 62b. In this example, the first side 62c is a pressure side and the second side 62d is a suction side. The airfoil section 62 generally extends in a radial direction relative to the central engine axis and spans from a first end 62e at an inner or first platform 64 to a second end 62f at a second or outer platform 66. The terms "inner" and "outer" refer to location with respect to the central engine axis A, i.e., radially inner or radially outer.

There is a span distance defined from the first end 62e to the second end 62f, with 0% span being at the first end 62e and 100% span being at the second end 62f. The (radial) location of intermediate positions between the ends 62e/62f are described as percentages between 0% and 100% and are representative of the distance of a given intermediate position from the first end 62e as a percentage of the total distance from the first end 62e to the second end 62f.

The airfoil wall 63 is continuous in that the platforms 64/66 and airfoil section 62 constitute a one-piece body. As an example, the airfoil wall 63 is formed of a ceramic material, an organic matrix composite (OMC), or a metal matrix composite (MMC). For instance, the ceramic material is a monolithic ceramic or a ceramic matrix composite (CMC) that is formed of ceramic fibers that are disposed in a ceramic matrix. The monolithic ceramic may be, but is not limited to, SiC or other silicon-containing ceramic. The ceramic matrix composite may be, but is not limited to, a SiC/SiC ceramic matrix composite in which SiC fibers are disposed within a SiC matrix. Example organic matrix composites include, but are not limited to, glass fiber, carbon fiber, and/or aramid fibers disposed in a polymer matrix, such as epoxy. Example metal matrix composites include, but are not limited to, boron carbide fibers and/or alumina fibers disposed in a metal matrix, such as aluminum. The fibers may be provided in fiber plies, which may be woven or unidirectional and may collectively include plies of different fiber weave configurations.

The airfoil section 62 circumscribes an interior through-cavity 68. The airfoil section 62 may have a single through-cavity 68 or, as shown, a rib 70 that that divides the interior through-cavity 68 into a forward cavity that is bound by the leading edge 62a portion of the airfoil wall 63 and an aft cavity that is bound by the trailing edge 62b portion of the airfoil wall 63.

Figure 3:
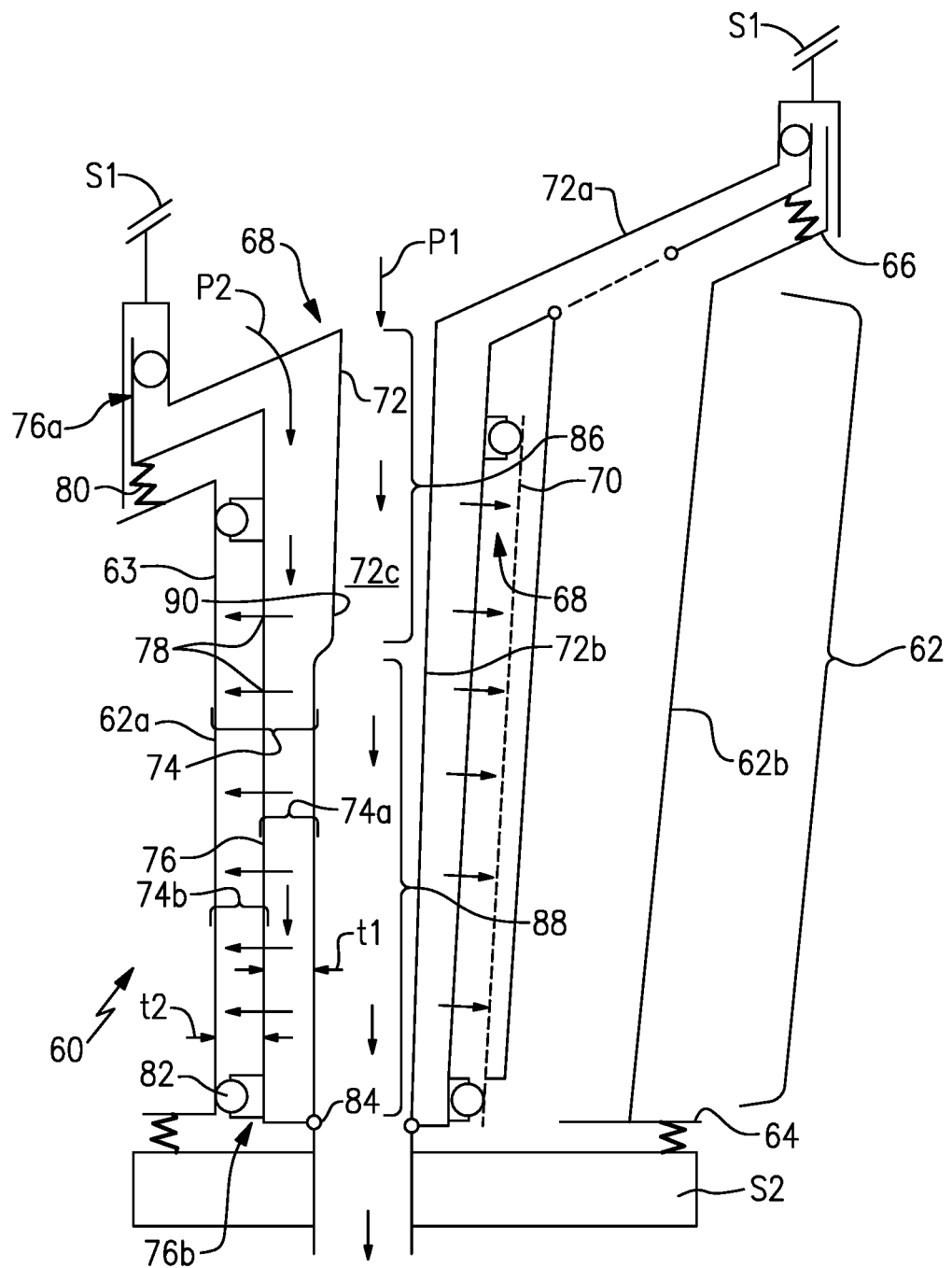
FIG. 3 illustrates a line representative of a sectioned view of the vane arc segment.

FIG. 3 shows a line representation of a sectioned view of the vane 60 taken in the plane of the chord of the airfoil section 62. The vane arc segment 60 further includes a spar 72 that extends through the through-cavity 68 and mechanically supports the airfoil wall 63. In this example, the spar 72 extends through the forward cavity defined by the rib 70 and the leading edge 62a portion of the airfoil wall 63. The spar 72 includes a spar platform 72a and a spar leg 72b that extends from the spar platform 72a into the through-cavity 68. The spar 72 is generally radially elongated and is secured with structural support S1 (e.g., a case) and support hardware S2. The spar 72 thereby traps the airfoil wall 63 between the spar platform 72a and support hardware S2 to mechanically support the airfoil wall 63 and react out loads, such as aerodynamic loads. In this regard, the spar 72 may be formed of a relatively high temperature resistance, high strength material, such as a single crystal metal alloy (e.g., a single crystal nickel- or cobalt-alloy).

The spar 72 is spaced from the airfoil wall 63 such that there is a gap 74 there between. The spar 72 bounds an internal through-passage 72c, the function of which will be described later below. The walls of the spar 72 are solid and continuous such that the through-passage 72c is substantially or fully fluidly isolated from the volume of the gap 74 at least in the airfoil section 62.

The vane arc segment 60 also includes a baffle 76 that is disposed in the gap 74 and serves to distribute cooling air onto the airfoil wall 63. The baffle 76 generally circumscribes the spar 72 and is spaced apart from the airfoil wall 63 and the spar 72 so as to divide the gap 74 into a plenum space 74a between the spar 72 and the baffle 76 and an impingement space 74b between the baffle 76 and the airfoil wall 63. The baffle 76 has impingement holes, represented at 78 with the depicted flow arrows, that are directed toward the airfoil wall 63 and connect the plenum space 74a and the impingement space 74b. In this example, the impingement holes 78 are located only in the forward portion of the baffle 76 and are directed toward the leading edge 62a to provide cooling thereof. The remaining aft portion of the baffle 76 does not have impingement holes, although it is to be understood that impingement holes could be provided anywhere on the baffle 76 where impingement cooling of the airfoil wall 63 is desired. The baffle 76 is formed of sheet metal but may alternatively be formed from an alloy using additive manufacturing. Sheet metal is relatively inexpensive, can be readily drilled to provide holes, and can be bent to the desired geometry.

Although it is not limited in how it is mounted, in the illustrated example, the baffle 76 is mounted on one or more spring members 80. The spring members 80 serve to position the baffle 76, yet are compliant in order to accommodate differences in thermal growth between the baffle 76 and the airfoil section 62. For example, the spring members 80 may be spring seals that additionally serve to seal the impingement space 74b. Additionally or alternatively, the baffle 76 may be fixed, e.g., by welding, to the spar 72.

Like the spar 72, the baffle 76 is generally radially elongated. However, unlike the support spar 72, the baffle 76 does not extend entirely through the airfoil section 62 to the support hardware S2. Rather, the baffle 76 defines first and second ends 76a/76b, and the second end 76b is sealed with the spar 72 and the airfoil wall 63. In this regard, the impingement holes 78 are the exclusive exit from the plenum space 74a into the impingement space 74b. In the illustrated example, the baffle 76 is sealed with the airfoil wall 63 by a seal member 82, such as a rope or spring seal, and is sealed with the spar 72 by a weld joint 84. Additional seal members 82 may be provided near the first end 76a.

The plenum space 74a and the impingement space 74b define respective thicknesses "t1" and "t2," which may also serve as surrogate indicators of the volumes of the spaces 74a/74b. The thicknesses t1 at a given span is the distance from a point on the inside surface of the baffle 76 at the span to the outside surface of the spar leg 72b along a direction normal to the point on the baffle 76. The thicknesses t2 is the distance from a point on the outside surface of the baffle 76 at the span to the inside surface of the airfoil wall 63 along a direction normal to the point on the baffle 76. It is to be appreciated, however, that this reference system is not limiting and that alternative equivalent reference systems may be used to the extent they are consistent with this disclosure.

Cooling air, such as bleed air from the compressor section 24, is conveyed into and through the through-passage 72c of the spar 72. This cooling air is destined for a downstream cooling location, such as a tangential onboard injector (TOBI). As indicated above, the through-passage 72c is substantially or fully fluidly isolated from the gap 74. Thus, the cooling air in the through-passage 72c does not intermix with cooling air in the gap 74. Furthermore, the baffle 76 facilitates shielding of the spar 72 from thermal radiation emitted by the hot airfoil wall 63. The baffle 76 thus helps to reduce thermal pick-up by the cooling air as it passes through the spar 72 and may thereby enhance cooling efficiency at the downstream location. Additionally, if the airfoil wall 63 experiences damage, such as burn-through, the baffle 76 may serve to thermally shield the spar 72 from hot gases.

Cooling air is also conveyed into the plenum space 74a as a source of air for impingement cooling. As the only exit from the plenum space 74a is through the impingement holes 78, all of the cooling air in the plenum space 74a is emitted as impingement cooling onto the airfoil wall 63. For example, the impingement holes 78 are directed toward the leading edge 62a. Alternatively or additionally, the cooling holes 78 may be directed toward the pressure side 62c and/or suction side 62d.

The internal through-passage 72c is provided with first pressurized air P1 and the plenum space 74a is provided with second pressurized air P2. The pressurized air P1 and P2 may differ in Mach number and thus also in pressure. For instance, the Mach number of the pressurized air P1 is greater than the Mach number of the pressurized air P2. As an example, the Mach number of P1 is greater than the Mach number of P2 by a factor of 2-3. At the expected Mach number of the pressurized air P1, the static pressure of the air in the through-passage 72c is lower than is desired for impingement cooling. The pressurized air P1 and P2 can come from the different sources (e.g., bleed air from different compressor stages) or the same source (same bleed air) that is divided into streams for P1 and P2 but that vary in pressure due to flow/exit paths.

In general, a leading edge of a turbine vane needs to be cooled. This is challenging in a two-cavity design with a forward spar that carries cooling air that is of insufficient pressure for impingement cooling. However, by substantially or fully fluidly isolating the through-passage 72c from the gap 74 and providing separate cooling air to the plenum space 74a, the leading edge 62a portion of the airfoil wall 63 is provided with cooling, while maintaining the ability of the through-passage 72c to convey cooling air for downstream use.

As discussed above, the spar 72 supports the airfoil wall 63. The spar platform 72a and the spar leg 72b are thus structural. In this regard, the spar leg 72b may be of robust size in order to handle the structural loads. The robust size of the spar leg 72b takes up much of the volume of the through-cavity 68 in the airfoil section 62, thus limiting the size of the gap 74 and space available for the baffle 76 in the gap 74.

In general, the thickness of an impingement space is selected to achieve a desired impingement cooling effect, and this thickness is typically uniform over the impingement cooling region. The geometry of the spar leg would also track the geometry of the baffle such that the plenum space would be of uniform thickness over the impingement cooling region. For a selected thickness of the impingement space, the remaining volume of the plenum space may be relatively small. This relatively small volume may limit the feed of cooling air into the plenum space and/or result in increased Mach numbers of the cooling air entering the plenum space. A limited feed and/or increased Mach number results in lower pressure of the cooling air in the plenum space and, as a consequence, lower impingement cooling effect. Conversely, there may also be portions in the plenum space 74a that receive less air flow than other regions. In that case, one or more orifices can be provided through the spar leg 72b. The orifice or orifices serve as flow sinks that draw cooling air from the plenum space 74a into the through-passage 72c, thereby pulling a greater amount of cooling air flow to the region that would otherwise have low flow. In general, however, due to desired flow margins of the cooling air for impingement and film cooling, the through-passage 72c and the plenum space 74a will exclude such orifices and be fully fluidly isolated.

In order to counter such a lower pressure condition, the thickness t1 of the plenum space 74a is non-uniform along a portion of the span length and, in particular, is non-uniform from the entrance of the cooling air P2 into the plenum space 74a. For example, the plenum space 74a has a first plenum space segment 86. The segment 86 is the initial portion of the plenum space 74a that receives the cooling air P2, which in the illustrated example is at the outer end of the vane arc segment 60. Alternatively, if the cooling air P2 were delivered from the inner diameter, the segment 86 would be at the inner end of the vane arc segment 60. The plenum space 74a also has a second, adjacent plenum space segment 88 that adjoins the segment 86. The segment 88 extends from the segment 86 to the end 76b of the baffle 76.

The thickness t1 is non-uniform over the segment 86. For instance, the plenum space 74a constantly converges from the entrance of the cooling air P2 to the start of the segment 88. Thereafter, the thickness t1 is substantially uniform over the segment 88. In these regards, the leg 72b includes a recessed portion 90, which establishes the thickness t1 of the plenum space 74a to be non-uniform and in essence serves to enlarge the volume of the segment 86 in comparison to the same leg that does not have the recessed portion. Additionally, in regions of the segment 86 that may deflect under the temperature and pressure conditions during operation, the enlarged volume provided by the plenum space 74a may facilitate maintaining impingement effectiveness.

As used herein, the term "substantially" refers to uniformity within typical design and manufacturing tolerances. For instance, a thickness along a plenum space may be nominally uniform by design but in practicality may vary somewhat due to unavoidable deviations in manufacturing and materials. Such variations are encompassed herein by "substantially" and may be, for example only, uniformity within +/−5%.

Figure 4:
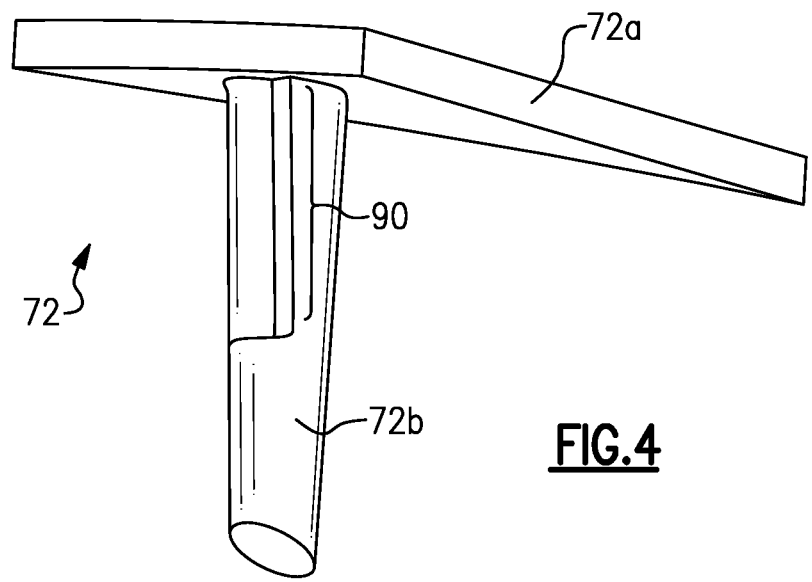
FIG. 4 illustrates an isolated view of a spar.
Figure 5:
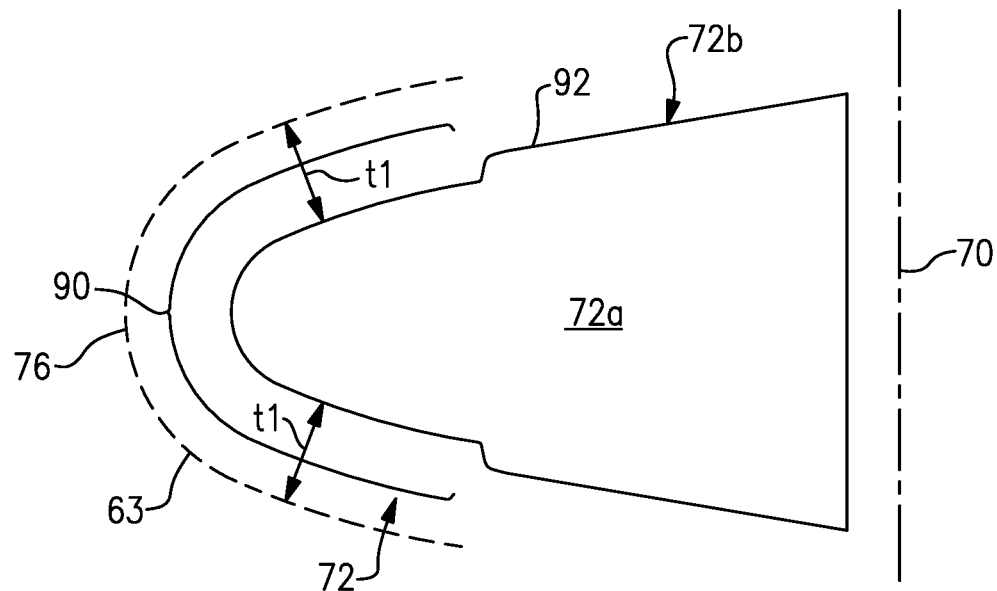
FIG. 5 illustrates a line representation of a section view of a spar.

FIG. 4 illustrates an isolated view of the spar 72, and FIG. 5 illustrates a line representation of a sectioned view through the spar leg 72b (as well as rib 70 and baffle 76 for context). The recessed portion 90 in this example is located in the forward region of the leg 72b and extends partially around the perimeter 92 of the leg 72b. As there are no cooling holes in the aft portion of the baffle 76, the recessed portion 90 need not extend to the aft region of the leg 72b. In this example, the leg 74b has an approximately triangular cross-section, and the recessed portion 90 is thus U-shaped at the nose of the triangle.

The recessed portion 90 serves to offset the side of the leg 72b from the baffle 76 and thereby increase the volume of the plenum space 74a in the segment 86. As a result, the recessed portion 90 projects into the through-passage 72c. The size of the recessed portion 90 is, however, small relative to the volume of the through-passage 72c and thus does not significantly affect flow in the through-passage 72c or the mechanical properties of the spar 72.

Cooling air P2 that enters the plenum space 74a into the enlarged volume of the segment 86 thus diffuses, permitting better feed and lower Mach numbers in comparison to a lower volume plenum space. At the span where the cooling air reaches the segment 88, the pressure is sufficient for the desired impingement cooling effect. Moreover, the hottest zones of the airfoil wall 63 may tend to be toward the outer diameter, requiring less cooling over the segment 88. As an example, the recessed portion 90 is in the span length of 50% to 100%. For instance, the recessed portion 90 begins at the span length of greater than 50% and extends to the span length of 100%. In one example, the recessed portion 90 begins at a span length of 60%-70% and extends to 100%.

The non-uniform thickness t1 over the segment 86 thus facilitates improved impingement cooling and, therefore, improved cooling of the airfoil wall 63. Moreover, leading edges of vanes operate at very high temperatures, and an additional cooling margin provided by the non-uniform thickness t1 may facilitate the enablement of higher gaspath temperatures for better engine efficiency. Furthermore, the higher pressure that is obtained via the lower Mach number of the air P2 may reduce ingestion of gaspath gases through film cooling holes in the airfoil wall 63, thereby increasing outflow margin from the film cooling holes.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane arc segment for a gas turbine engine, comprising:
   an airfoil section having an airfoil wall defining a leading edge, a trailing edge, a pressure side, a suction side, and first and second ends defining a span length there between, the airfoil section having an internal cavity;
   a spar supporting the airfoil section, the spar having a leg extending in the internal cavity, the leg being spaced from the airfoil wall such that there is a gap there between, the spar having an internal through-passage in the leg and passing through the internal cavity; and
   a baffle in the internal cavity dividing the gap into a plenum space between the leg and the baffle and an impingement space between the baffle and the airfoil wall, the baffle having impingement holes directed toward the airfoil wall that connect the plenum space and the impingement space, the impingement space being of substantially uniform thickness along at least a portion of the span length and the plenum space being of non-uniform thickness along a different portion of the span length.

2. The vane arc segment as recited in claim 1, wherein the plenum space has a first plenum space segment over which the plenum space is of the non-uniform thickness and a second, adjacent plenum space segment over which the plenum space has substantially uniform thickness.

3. The vane arc segment as recited in claim 1, wherein the leg includes a recessed portion along which the plenum space has the non-uniform thickness.

4. The vane arc segment as recited in claim 3, wherein, in a cross-section through the leg and the through-passage, the leg has a perimeter that defines a leading end nose and encompasses the through-passage, and the recessed portion extends across the leading end nose.

5. The vane arc segment as recited in claim 4, wherein the span length is from 0% span at the first end to 100% span at the second end, and the recessed portion is in the span length of 50% to 100%.

6. The vane arc segment as recited in claim 5, wherein the recessed portion begins at the span length of greater than 50% and extends to the span length of 100%.

7. The vane arc segment as recited in claim 4, wherein the recessed portion is U-shaped.

8. The vane arc segment as recited in claim 4, wherein the recessed portion projects into the through-passage.

9. The vane arc segment as recited in claim 1, wherein the airfoil section is ceramic.

10. The vane arc segment as recited in claim 1, wherein the plenum space has a first plenum space segment over which the plenum space is of the non-uniform thickness and converges to a start of a second, plenum space segment over which the plenum space has substantially uniform thickness.

11. The vane arc segment as recited in claim 1, wherein the through-passage is fluidly isolated from the gap.

12. The vane arc segment as recited in claim 1, wherein the leg extends through the airfoil section and protrudes from the cavity.

13. The vane arc segment as recited in claim 12, wherein the through-passage extend a full radial length of the leg.

14. A vane arc segment for a gas turbine engine, comprising:
    a ceramic airfoil section having an airfoil wall defining a leading edge, a trailing edge, a pressure side, a suction side, and first and second ends defining a span length there between, the ceramic airfoil section having an internal cavity;
    a spar supporting the ceramic airfoil section, the spar having a leg extending in the internal cavity, the leg being spaced from the airfoil wall such that there is a gap there between, the spar having an internal through-passage, the internal through-passage conveying first pressurized air; and
    a baffle in the internal cavity dividing the gap into a plenum space between the leg and the baffle and an impingement space between the baffle and the airfoil wall, the baffle having impingement holes directed toward the airfoil wall that connect the plenum space and the impingement space, the plenum space conveying second pressurized air that discharges through the impingement holes onto the leading edge of the airfoil wall, the impingement space being of substantially uniform thickness along at least a portion of the span length, the plenum space being of non-uniform thickness along a different portion of the span length, the non-uniform thickness diffusing the second pressurized air, the plenum space having a first plenum space segment over which the plenum space is of the non-uniform thickness and a second, adjacent plenum space segment over which the plenum space has the substantially uniform thickness, the leg including a recessed portion along which the plenum space has the non-uniform thickness, and the recessed portion projects into the through-passage and is U-shaped.

15. The vane arc segment as recited in claim 14, wherein the span length is from 0% span at the first end to 100% span at the second end, and the recessed portion is in the span length of 50% to 100%.

16. The vane arc segment as recited in claim 14, wherein the through-passage is in the leg.

17. A gas turbine engine comprising:
    a compressor section;
    a combustor in fluid communication with the compressor section; and
    a turbine section in fluid communication with the combustor, the turbine section having a vane arc segment that includes:
      an airfoil section having an airfoil wall defining a leading edge, a trailing edge, a pressure side, a suction side, and first and second ends defining a span length there between, the airfoil section having an internal cavity,
      a spar supporting the airfoil section, the spar having a leg extending in the internal cavity, the leg being spaced from the airfoil wall such that there is a gap there between, the spar having an internal through-passage, and
      a baffle in the internal cavity dividing the gap into a plenum space between the leg and the baffle and an impingement space between the baffle and the airfoil wall, the baffle having impingement holes directed toward the airfoil wall that connect the plenum space and the impingement space, the impingement space being of substantially uniform thickness along at least a portion of the span length, the plenum space being of non-uniform thickness along a different portion of the span length, the plenum space has a first plenum space segment over which the plenum space is of the non-uniform thickness and a second, adjacent plenum space segment over which the plenum space has substantially uniform thickness, the leg includes a recessed portion along which the plenum space has the non-uniform thickness, and the recessed portion projects into the through-passage and is U-shaped.

18. The gas turbine engine as recited in claim 17, wherein the span length is from 0% span at the first end to 100% span at the second end, and the recessed portion is in the span length of 50% to 100%.

* * * * *